United States Patent
Reau et al.

(10) Patent No.: US 11,898,656 B1
(45) Date of Patent: Feb. 13, 2024

(54) PACKING FOR A HIGH-PRESSURE VALVE

(71) Applicant: Dresser, LLC, Houston, TX (US)

(72) Inventors: Aurelien Reau, Flers (FR); Mickael Olaya, Valdallière (FR); Arnaud Riviere, Couvains (FR); Romain Chenu, Condé-sur-Noireau (FR); Valentin Mercier, Flers (FR)

(73) Assignee: Dresser, LLC, Houston, TX (US)

( * ) Notice: Subject to any disclaimer, the term of this patent is extended or adjusted under 35 U.S.C. 154(b) by 0 days.

(21) Appl. No.: 18/146,060

(22) Filed: Dec. 23, 2022

(51) Int. Cl.
*F16K 41/04* (2006.01)
*F16K 27/02* (2006.01)

(52) U.S. Cl.
CPC ............. *F16K 41/04* (2013.01); *F16K 27/02* (2013.01)

(58) Field of Classification Search
CPC ........................ F16K 41/04; F16K 11/0856
See application file for complete search history.

(56) References Cited

U.S. PATENT DOCUMENTS

| 2015/0267818 A1* | 9/2015 | Rahman | F16K 1/54 |
| | | | 137/862 |
| 2023/0250893 A1* | 8/2023 | Ma | F16K 37/0083 |
| | | | 137/551 |

* cited by examiner

*Primary Examiner* — Kevin R Barss
(74) *Attorney, Agent, or Firm* — Mintz Levin Cohn Ferris Glovsky and Popeo, P.C.

(57) ABSTRACT

A valve bonnet defines a packing box having an inner surface Roughness Average (Ra) of 0.15 or less, for example, between 0.10 and 0.15. Multiple Polytetrafluoroethylene (PTFE) packing rings are in a packing stack. A packer is bolted to the bonnet and extends into the packing box. The packer is configured to apply a packing pressure on the packing, for example, between 100 megapascals (MPa) and 200 MPa. Such arrangements can allow for high pressure valves, for example valves that can retain up to 10,000 pounds per square inch (PSI) of pressure or up to 15,000 PSI.

20 Claims, 4 Drawing Sheets

PACKING FOR A HIGH-PRESSURE VALVE

TECHNICAL FIELD

This disclosure relates to packing for a high-pressure valve.

BACKGROUND

In oil and gas processing, valves are often used to direct and regulate fluids through conduits within a plant. Valves themselves include an outer housing that defines an internal flow passage. Within the valve are valve internals that regulate flow within the flow passage. Some valves include a valve stem that extends from the valve internals, through the valve housing to an outside environment. The valve stem can be used to manipulate the valve internals, for example, by an operator or an actuator. As the stem penetrates the valve housing that retains the fluid, a seal, or packing, surrounds the stem to prevent or mitigate leaks from the flow passage to the outside environment along the stem.

SUMMARY

This disclosure is a high-pressure valve with the following features. A valve bonnet defines a packing box having an inner surface Roughness Average (Ra) of 0.15 or less, for example, between 0.10 and 0.15. In some embodiments, a valve stem that extends through a valve bonnet and into a valve body, defines an outer surface having a Ra of 0.15 or less. Multiple Polytetrafluoroethylene (PTFE) packing rings are in a packing stack. A packer is bolted to the bonnet and extends into the packing box. The packer is configured to apply a packing pressure (i.e. stress) on the packing, for example, between 100 megapascals (MPa) and 200 MPa. Such arrangements can allow for high pressure valves, for example valves that can retain 10,000 pounds per square inch (PSI) of pressure or 15,000 PSI.

In some embodiments, the valve can further include anti-extrusion rings within the packing stack. In such embodiments, the anti-extrusion rings include materials harder that PTFE, for example, carbon, such as graphite, and/or Inconel. In general, in embodiments with anti-extrusion rings, the anti-extrusion rings are at opposite ends of the packing stack.

In some embodiments, the valve further includes a valve body attached to the valve bonnet, for example, by bolts or similar fasteners. A metal gasket can be between the valve bonnet and the valve body. In some embodiments, the metal gasket defines a substantially T-shaped profile. In some embodiments, the metal gasket can include a self-energized and/or pressure energized metal gasket.

An example of the subject matter described within this disclosure is a method with the following features. Valve packing that includes PTFE packing rings is provided. The provided valve packing is inserted into a packing box. The packing box has an inner surface roughness of Roughness Average (Ra) of 0.15 or less, for example between 0.10 and 0.15. A packing pressure between 100 megapascals (MPa) and 200 MPa is applied to the valve packing by a packer.

In some embodiments anti-extrusion rings can be provided and inserted into the packing box with the PTFE packing rings. In such embodiments, an anti-extrusion ring can be arranged on either side of the PTFE packing rings prior to inserting the valve packing into the packing box.

In operation, the packing box is attached to a valve, and pressure is retained within the valve by the valve packing, for example, 10,000 PSI of pressure or 15,000 PSI can be retained.

BRIEF DESCRIPTION OF THE FIGURES

These and other features will be more readily understood from the following detailed description taken in conjunction with the accompanying drawings, in which.

DETAILED DESCRIPTION

Certain embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting embodiments and features illustrated or described in connection with one embodiment may be combined with the features of other embodiments. Such modifications and variations are intended to be included within the scope of the present invention.

Further, in the present disclosure, like-named components of the embodiments generally have similar features, and thus within a particular embodiment each feature of each like-named component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape. Sizes and shapes of the systems and devices, and the components thereof, can depend at least on the anatomy of the subject in which the systems and devices will be used, the size and shape of components with which the systems and devices will be used, and the methods and procedures in which the systems and devices will be used.

High-pressure valves, for example, valves rated to handle an internal pressure of 10,000 pounds per square inch (PSI) or more, are difficult to manufacture due to limitations in materials and geometries that can be used with such operation conditions. Such difficulties also extend to selecting the packing material around the valve stem, also called a packing stack, to prevent or reduce leaks around the valve stem. This disclosure describes a packing stack made with standard materials and packing box that can be used together in high-pressure valve applications.

Figure 1:
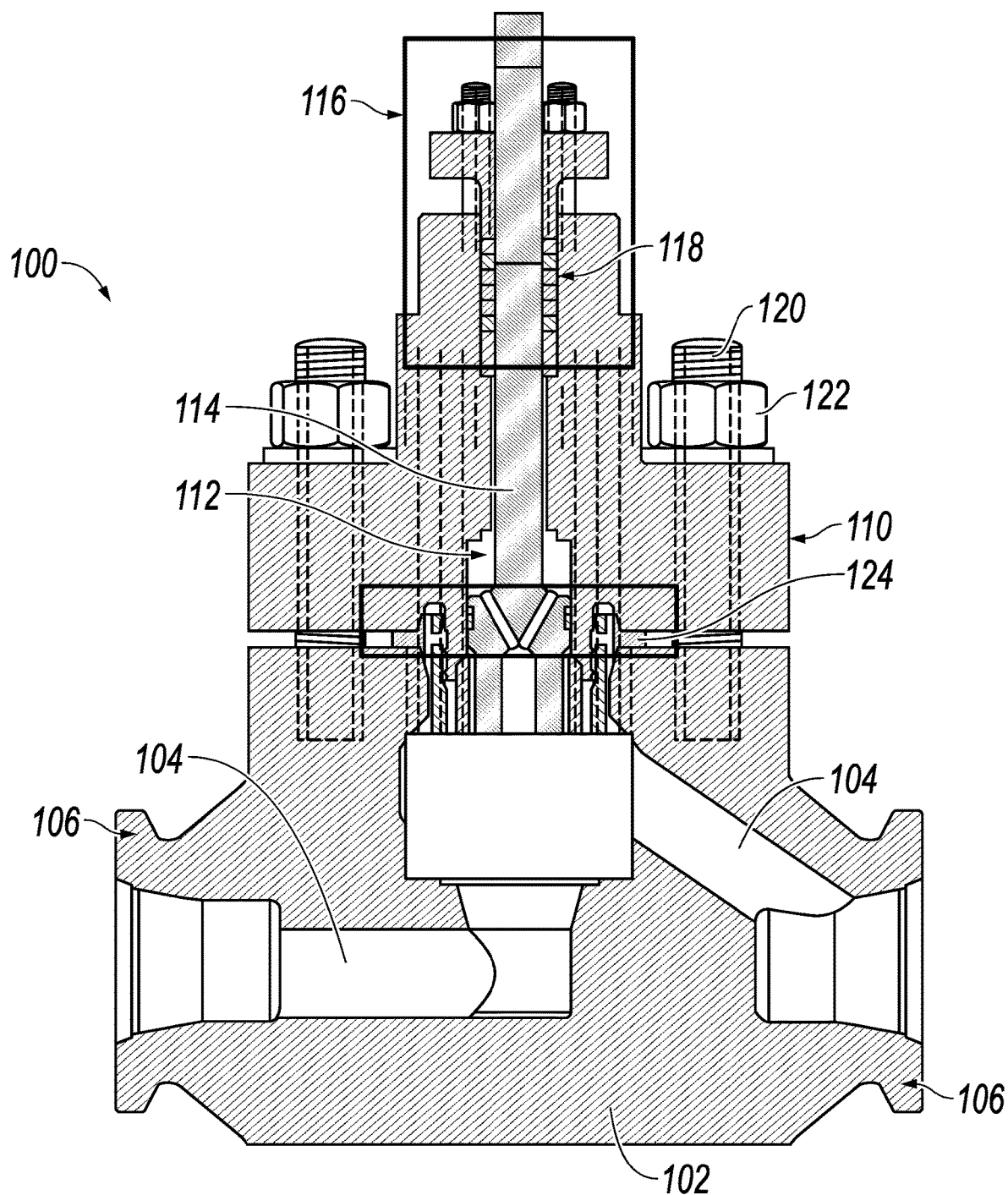
FIG. 1 is a side cross-sectional view of an example valve.

A cross-sectional view of such a high-pressure valve 100 is illustrated in FIG. 1. In the context of this disclosure, a high-pressure valve is a valve that is capable of retaining pressures of at least 10,000 pounds per square inch, for example, 15,000 pounds per square inch. The valve includes a valve body 102 that defines a primary flow passage 104 for a working fluid. The valve body can be constructed as a single unitary piece, for example, through casting, forging, or additive manufacturing. In some embodiments, the primary flow passage 104 can be formed within the valve body through traditional machining. Alternatively or in addition, portions of the valve body 102, such as the flanges 106, may be welded, brazed, or otherwise attached to the valve body 102. An upper portion of the valve body 102 defines a cavity arranged to receive valve internals 108, for example, a valve plunger or cage. Different valve internals 108 can be used depending upon the type of valve, for example, a gate and stem may be received for a gate valve, a ball may be received for a ball valve, a plunger and a stem for a globe valve, etc.

Atop the valve body 102 rests the valve bonnet 110. The valve bonnet 110 defines a central passage 112 for a valve stem 114 to extend from an upper end of the valve bonnet 110, through the valve bonnet 110, and to the valve internals 108. The valve stem 114 exchanges actuating force between the valve internals 108 and an external actuator or operator. An upper end of the central passage 112 defines a packing box 116. The packing box 116 includes seals 118 to prevent fluid egress from the primary flow passage 104 within the valve body 102. More details on the seals 118 are provided throughout this disclosure. In the illustrated embodiment, the bonnet 110 is attached to the valve body by threaded studs 120 and nuts 122. Other attachment mechanisms can be used without departing from this disclosure, for example, bolts or clamps can be used. In some embodiments, a gasket 124 is included between the valve bonnet 110 and the valve body.

Figure 2:
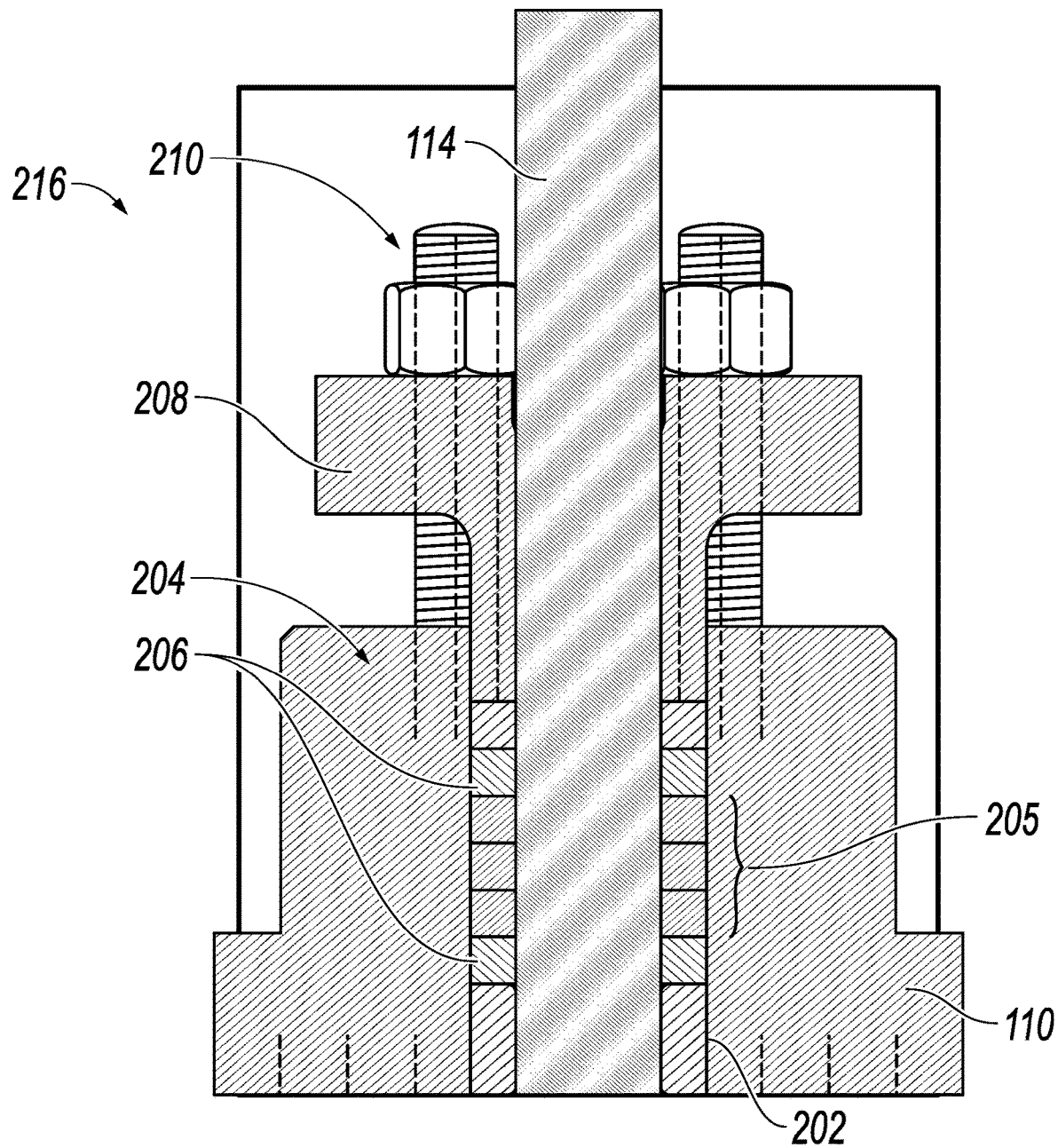
FIG. 2 is a side cross-sectional diagram of a packing box of the example valve illustrated in FIG. 1.

Details of the packing box 116 are shown in FIG. 2. The packing box 116 itself, as previously discussed, is defined by the bonnet 110. The inner surface 202 of the packing box 116, particularly the surface parallel to the valve stem 114, has a Roughness Average (Ra) of 0.15 or less, for example, a Ra of 0.10. In comparison, a typical packing box has a Ra of substantially 3.2 (plus or minus 5%). In some instances, additional machining may be used to achieve such a smooth inner surface 202 after the packing box 116 has been formed. Within the packing box 116 are a seals 118, or a packing stack 204, that surrounds the stem 114 and seals (e.g. partially or fully seals) an annulus defined by an outer surface of the stem 114 and an inner surface 202 of the packing box 116.

The packing stack 204 includes packing rings 205. In some embodiments, the packing rings 205 include Polytetrafluoroethylene (PTFE) packing rings 205. While virgin PTFE can be used in the packing rings 205, in some embodiments, PTFE augmented with carbon (for example, carbon braided) or other fibers can be used without departing from this disclosure. In some embodiments, anti-extrusion rings 206 are included within the packing stack 204, more specifically, at opposite ends of the packing stack 204. These anti-extrusion rings 206 are made of a harder material than the packing rings 205, for example in some embodiments, the anti-extrusion rings 206 can include carbon and/or Inconel. In some embodiments, the carbon can include graphite. In some embodiments, a total height of the anti-extrusion rings 206 is substantially half a total height of the packing rings 205 (within 10%). In some embodiments, the total height of the anti-extrusion rings 206 is greater than half the total height of the packing rings 205. In some embodiments, each anti-extrusion rings' height is half the height of an individual packing ring 205 or greater. In other words, in some embodiments each anti-extrusion ring 206 is at least half the height of one packing rings 205. In some embodiments, the packing stack defines a reduced control gap to further reduce a leakage rate through the packing stack 204. In some embodiments, clearances at various control gaps 212 are reduced in comparison to standard (low-pressure) valves. Such gaps 212 are between the stem 114 and the bonnet 110, between a guide bushing 214 at the bottom of the packing box 116 and the stem 114, between the packer 208 and stem 114, and between packer 208 and bonnet 110.

A packer 208 is attached, for example, by bolts or studs 210, to the upper end of the bonnet 110 and extends partially into the packing box 116 to abut an upper end of the packing stack 204. The packer 208 is configured to apply a packing pressure (i.e. stress) on the packing stack 204. Such pressure can be regulated with the bolts or studs 210, for example, a desired packing pressure may be proportional to a torque of the bolts or nuts on the studs 210. In some embodiments, the packing pressure is set between 100 megapascals (MPa) and 200 MPa. In some embodiments, such loads can be applied and/or adjusted while the valve is pressurized with fluid. The packer 208 can be tightened with or without live loading. It is noted that such high packing pressure have been used with PTFE packing rings by the applicant, despite such PTFE rings not being rated for such packing pressure. For example, PTFE rings are commonly rated for substantially 30 MPa of packing pressure in such an application; however, the applicant has tested the arrangements described herein, including the high packing pressure, and have found that leakage through the packing can be less than $1.78 \times 10^{-4}$ millibar liters per second per millimeter of stem diameter in static and dynamic condition. Such tests were conducted with helium.

Figure 3:
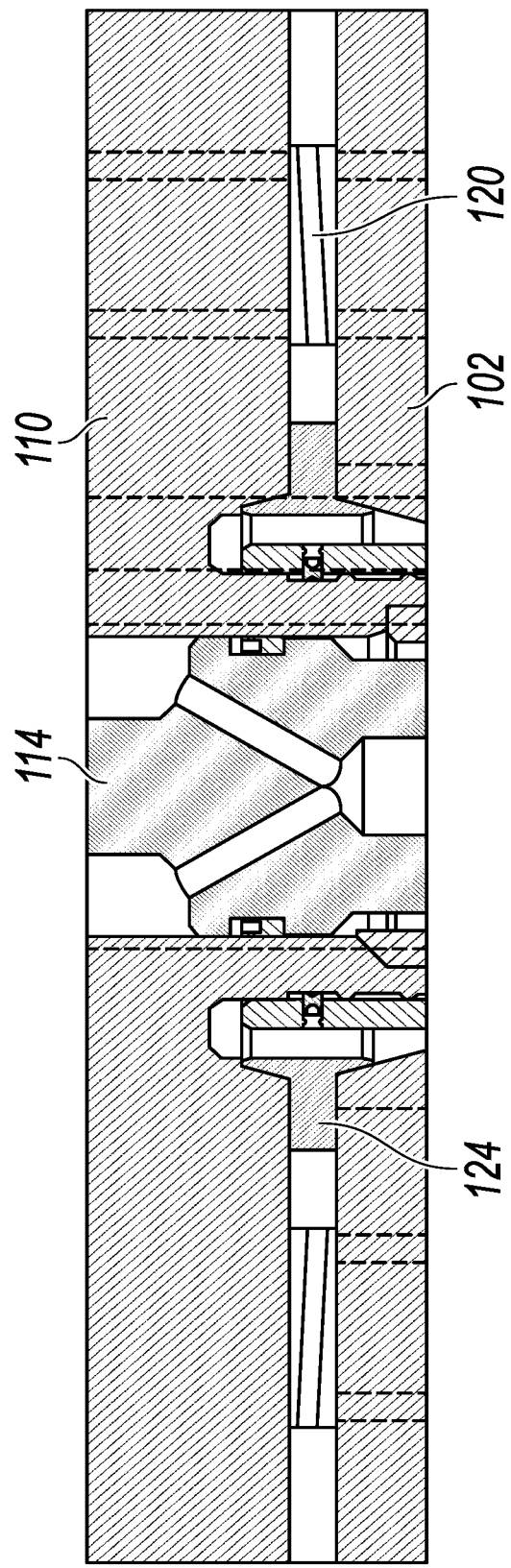
FIG. 3 is a side cross-sectional diagram of an interface between a valve body and a valve bonnet of the example valve illustrated in FIG. 1.

Moving further down the valve, FIG. 3 illustrates the interface between a valve body 102 and a valve bonnet 110. As previously discussed, in some embodiments, the bonnet 110 is attached to the body 102 by studs 120. Between the body 102 and the bonnet 110 a gasket can be compressed, for example, by tension within the studs 120. Various gasket profiles can be used without departing from this disclosure, for example, the substantially T-shaped profile shown in FIG. 3. Such a gasket profile is commonly used in high-pressure applications; however, other self-energized gaskets can be used without departing from this disclosure. In some embodiments, the gasket keeps a leakage rate down to fifty parts per million or less.

Figure 4:
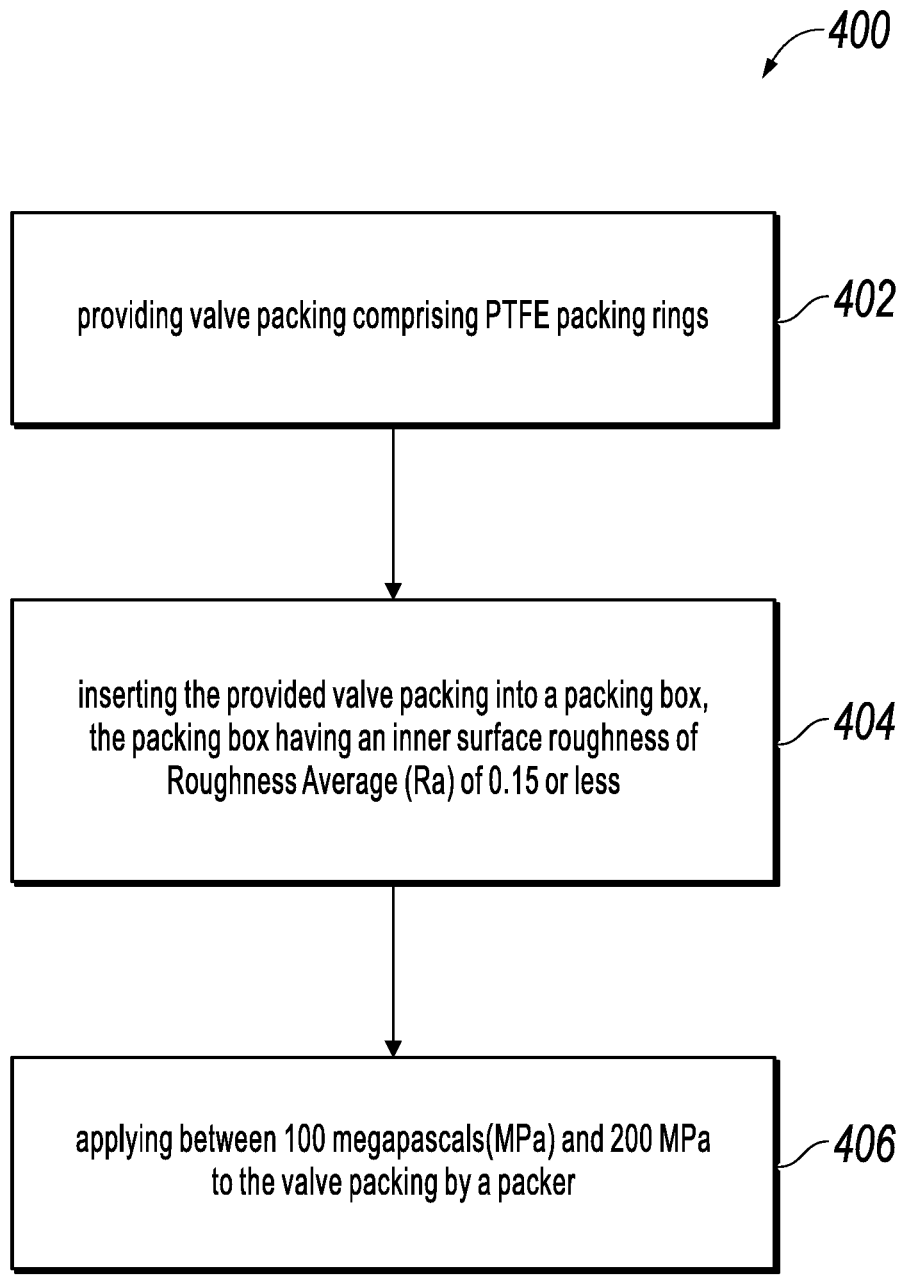
FIG. 4 is a flowchart of an example method that can be used with aspects of this disclosure.

FIG. 4 is a flowchart of an example method 400 that can be used with aspects of this disclosure. At 402, valve packing 204 that includes PTFE packing rings 205 is provided. In some embodiments, anti-extrusion rings 206 are provided with the PTFE packing rings 205.

At 404, the provided valve packing rings 205 are inserted into the packing box 116. The packing box 116 can include an inner surface with a roughness average (Ra) of 0.15 or less, for example, 0.10 Ra. In embodiments where anti-extrusion rings 206 are also provided, the anti-extrusion rings 206 are also inserted into the packing box 116, for example, the anti-extrusion rings 206 can be placed on either side of the PTFE rings 205 prior to inserting the valve packing into the packing box 116.

At 406, between 100 MPa and 200 MPa of pressure is applied to the valve packing 204 by the packer 208. During operation, pressure is retained within the valve at least in-part by the packing. In some embodiments, the pressure retained within the valve is up to 10,000 PSI. In some embodiments, the pressure retained within the valve is up to 15,000 PSI.

While this disclosure contains many specific embodiment details, these should not be construed as limitations on the scope of what may be claimed, but rather as descriptions of features specific to particular embodiments. Certain features that are described in this disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments, and it should be understood that the described components and systems can generally be integrated together in a single product or packaged into multiple products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A high-pressure valve comprising:
   a valve bonnet defining a packing box having an inner surface Roughness Average (Ra) of 0.15 or less;
   a plurality of Polytetrafluoroethylene (PTFE) packing rings in a packing stack; and
   a packer bolted to the bonnet and extending into the packing box, the packer configured to apply a packing pressure on the packing, wherein the packing pressure is between 100 megapascals (MPa) and 200 MPa.
2. The high-pressure valve of claim 1, further comprising anti-extrusion rings within the packing stack.
3. The high-pressure valve of claim 2, wherein the anti-extrusion rings comprise materials harder than PTFE.
4. The high-pressure valve of claim 2, wherein the anti-extrusion rings are at opposite ends of the packing stack.
5. The high-pressure valve of claim 1, further comprising:
   a valve body attached to the valve bonnet;
   a valve stem extending though the valve bonnet and into the valve body, the valve stem defining an outer surface having an Ra of 0.15 or less; and
   a metal gasket between the valve bonnet and the valve body.
6. The high-pressure valve of claim 5, wherein the metal gasket comprises a substantially T-shaped profile.
7. The high-pressure valve of claim 5, wherein the valve is configured to retain pressures of 10,000 pounds per square inch.
8. A high-pressure valve comprising:
   a valve bonnet defining a packing box having an inner surface Roughness Average (Ra) between 0.10 and 0.15;
   a plurality of Polytetrafluoroethylene (PTFE) packing rings in a packing stack;
   a packer bolted to the bonnet and extending into the packing box, the packer configured to apply a pressure on the packing;
   a valve body;
   a valve stem extending though the valve bonnet and into the valve body, the valve stem defining an outer surface having an Ra of 0.15 or less; and
   a metal gasket between the valve bonnet and the valve body,
   wherein the valve is configured to retain pressures of at least 10,000 pounds per square inch.
9. The high-pressure valve of claim 8, wherein the packing pressure is between 100 megapascals (MPa) and 200 MPa.
10. The high-pressure valve of claim 8, further comprising anti-extrusion rings within the packing stack.
11. The high-pressure valve of claim 10, wherein the anti-extrusion rings comprise carbon and Inconel.
12. The high-pressure valve of claim 10, wherein the anti-extrusion rings are at opposite ends of the packing stack.
13. The high-pressure valve of claim 8, wherein the metal gasket comprises a self-energized or pressure energized gasket.
14. The high-pressure valve of claim 8, wherein the valve is configured to retain pressures of up to 15,000 pounds per square inch.
15. A method comprising:
    providing valve packing comprising Polytetrafluoroethylene (PTFE) packing rings;
    inserting the provided valve packing into a packing box, the packing box having an inner surface roughness of Roughness Average (Ra) of 0.15 or less; and
    applying between 100 megapascals (MPa) and 200 MPa to the valve packing by a packer.
16. The method of claim 15, wherein a valve stem extends through the valve, the valve stem defining an outer surface having an Ra of 0.15 or less.
17. The method of claim 15, wherein the packing box is attached to a valve, the method further comprising:
    retaining pressure within the valve by the valve packing.
18. The method of claim 17, wherein the pressure is 10,000 PSI.
19. The method of claim 15, further comprising:
    providing anti-extrusion rings; and
    inserting the anti-extrusion rings into the packing box.
20. The method of claim 19, further comprising:
    arranging an anti-extrusion ring on either side of the PTFE packing rings prior to inserting the valve packing into the packing box.

* * * * *